United States Patent [19]
MacDonald

[11] Patent Number: 5,600,839
[45] Date of Patent: Feb. 4, 1997

[54] SYSTEM AND METHOD FOR CONTROLLING ASSERTION OF A PERIPHERAL BUS CLOCK SIGNAL THROUGH A SLAVE DEVICE

[75] Inventor: James R. MacDonald, Buda, Tex.

[73] Assignee: Advanced Micro Devices, Inc., Sunnyvale, Calif.

[21] Appl. No.: 131,092

[22] Filed: Oct. 1, 1993

[51] Int. Cl.$^6$ .................................. G06F 1/32; G06F 1/04
[52] U.S. Cl. ........................ 395/750; 395/560; 364/240; 364/240.2; 364/240.5; 364/270; 364/270.3; 364/273.1; 364/273.2; 364/273.3; 364/DIG. 1
[58] Field of Search .................................. 395/325, 750, 395/550, 800, 287; 364/707; 370/85.6

[56] References Cited

U.S. PATENT DOCUMENTS

| | | | |
|---|---|---|---|
| 4,545,030 | 10/1985 | Kitchin | 395/550 |
| 4,835,737 | 5/1989 | Herring et al. | 395/283 |
| 5,021,950 | 6/1991 | Nishikawa | 395/325 |
| 5,150,467 | 9/1992 | Hayes et al. | 395/287 |
| 5,167,024 | 11/1992 | Smith et al. | 395/375 |
| 5,189,647 | 2/1993 | Suzuki et al. | 368/10 |
| 5,195,185 | 3/1993 | Marenin | 395/303 |
| 5,202,966 | 4/1993 | Woodson et al. | 395/325 |
| 5,237,692 | 8/1993 | Raasch et al. | 395/725 |
| 5,339,445 | 8/1994 | Gasztonyi | 395/750 |
| 5,363,492 | 11/1994 | King et al. | 395/325 |
| 5,390,350 | 2/1995 | Chung et al. | 395/150 |
| 5,404,546 | 4/1995 | Stewart | 395/750 |
| 5,428,790 | 6/1995 | Harper et al. | 395/750 |
| 5,450,574 | 9/1995 | Madter et al. | 395/550 |
| 5,452,434 | 9/1995 | MacDonald | 395/550 |
| 5,461,652 | 10/1995 | Hongo | 368/156 |
| 5,493,684 | 2/1996 | Gephardt et al. | 395/750 |

*Primary Examiner*—Gopal C. Ray
*Attorney, Agent, or Firm*—Conley, Rose & Tayon, P.C.; B. Noel Kivlin

[57] ABSTRACT

A system and method for controlling a peripheral bus clock signal through a slave device are provided that accommodate a power conservation scheme in which a peripheral bus clock signal may be stopped, for example, by a power management unit or other central resource. Prior to stopping the peripheral bus clock signal, an indicator signal is generated at a clock request line by a clock control circuit. If the slave device continues to require the peripheral bus clock signal, the slave device responsively generates a clock request signal. The clock control circuit receives the clock request signal and accordingly prevents the peripheral bus clock signal from stopping. The system may further allow an alternate bus master to assert the clock request signal to re-start the peripheral bus clock signal after it has stopped. The alternate bus master can thereby generate a synchronous bus request signal to attain mastership of the peripheral bus. As a result of the system, a slave device can prevent the stopping of the peripheral bus clock signal at the completion of a peripheral bus cycle if the clock signal continues to be required. The system further accommodates a power management scheme in which the peripheral bus clock signal can be stopped and that allows an alternate bus master to re-start the peripheral bus clock signal.

18 Claims, 9 Drawing Sheets

SYSTEM AND METHOD FOR CONTROLLING ASSERTION OF A PERIPHERAL BUS CLOCK SIGNAL THROUGH A SLAVE DEVICE

BACKGROUND OF THE INVENTION

1. Field of the Invention

This invention relates to power management within computer systems and, more particularly, to a system and method for controlling a peripheral bus clock signal through a slave device.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific technique involves the capability of stopping clock signals that drive inactive or idle circuit portions. A system employing such a technique typically includes a power management unit that detects or predicts inactive circuit portions and accordingly stops the clock signals that are associated with the inactive circuit portions. By turning off "unused" clock signals, overall power consumption of the system is decreased.

Although the capability of stopping "unused" clock signals has been generally successful in reducing power consumption, the technique has generally not been applied to clock signals that drive peripheral buses having alternate bus masters connected thereto. The reason for this limitation is best understood from the following example.

FIG. 1 is a block diagram that illustrates a computer system 10 including a microprocessor (CPU) 12, a system memory 14, a bridge/memory controller 16, and a bus interface and arbiter unit 18. A CPU local bus 20 couples the microprocessor 12 to bridge/memory controller 16 and bus interface and arbiter unit 18. A system memory bus 22 couples system memory 14 to bridge/memory controller 16. An alternate bus master 26 labeled "Master1" and a second alternate bus master 28 labeled "Master2" are coupled to the bus interface and arbiter unit 18 through a peripheral bus 30. A slave device 31 is similarly coupled to bus interface and arbiter unit 18 through peripheral bus 30.

When alternate bus master 26 requires mastership of peripheral bus 30, a request signal labeled $\overline{REQ1}$ is asserted by the alternate bus master 26 and is detected by bus interface and arbiter unit 18. If mastership of the bus is granted in accordance with the internal arbitration logic, the bus interface and arbiter unit 18 asserts a grant signal labeled $\overline{GNT1}$ and, accordingly, alternate bus master 26 attains mastership of peripheral bus 30 and may execute the desired cycle.

In the system of FIG. 1, the request signal $\overline{REQx}$ (i.e., $\overline{REQ1}$ or $\overline{REQ2}$) must be asserted by the associated alternate bus master synchronous to the peripheral bus clock signal CLK. This requirement is specified by several prevalently utilized peripheral bus standards, such as the PCI bus standard. As a result of the requirement, systems employing such peripheral bus standards are designed such that the peripheral bus clock signal CLK is always turned on, thereby allowing an alternate bus master to generate a synchronous request signal. In such systems, however, power is wasted when the peripheral bus is idle.

An additional hindrance to the employment of clock-stopping power reduction techniques for peripheral buses arises since slave devices may require a clock signal beyond the end of a peripheral bus cycle. For example, additional clock cycles may be required at the completion of a peripheral bus cycle for slave device 31 to empty an internal FIFO. If the clock signal were stopped during such a situation, the performance of the system as well as the integrity of data may be adversely affected.

SUMMARY OF THE INVENTION

The problems outlined above are in large part solved by a system and method for controlling a peripheral bus clock signal through a slave device according to the present invention. The system accommodates a power conservation scheme in which a peripheral bus clock signal may be stopped, for example, by a power management unit or other central resource. Prior to stopping the peripheral bus clock signal, an indicator signal is generated at a clock request line by a clock control circuit. If the slave device continues to require the peripheral bus clock signal, the slave device responsively generates a clock request signal. The clock control circuit receives the clock request signal and accordingly prevents the peripheral bus clock signal from stopping. The system may further allow an alternate bus master to assert the clock request signal to re-start the peripheral bus clock signal after it has stopped. The alternate bus master can thereby generate a synchronous bus request signal to attain mastership of the peripheral bus. As a result of the system, a slave device can prevent the stopping of the peripheral bus clock signal at the completion of a peripheral bus cycle if the clock signal continues to be required. The system further accommodates a power management scheme in which the peripheral bus clock signal can be stopped and that allows an alternate bus master to re-start the peripheral bus clock signal.

Broadly speaking, the present invention contemplates a computer system comprising a microprocessor, a bus interface unit coupled to a local bus and to a peripheral bus, and a clock generator circuit for providing a peripheral bus clock signal on the peripheral bus, wherein the peripheral bus clock signal is capable of being selectively stopped and re-started. The computer system further comprises a clock control circuit coupled to the clock generator circuit wherein the clock control circuit generates a clock-off control signal to stop the peripheral bus clock signal upon an occurrence of a predetermined condition. The clock control circuit deasserts a clock request signal at a clock request line prior to generating the clock-off control signal and stopping the peripheral bus clock signal. The computer system finally includes a slave device coupled to the peripheral bus that monitors the clock request line and asserts the clock request signal if the peripheral bus clock signal is required by the slave device.

The present invention additionally contemplates a system for controlling a peripheral bus clock signal comprising a clock generator for generating the peripheral bus clock signal, wherein the peripheral bus clock signal is capable of being stopped and re-started in response to an ON/OFF signal. The system further comprises a peripheral bus including a clock line for transferring the peripheral bus clock signal and a clock control circuit coupled to the clock generator, wherein the clock control circuit includes a state machine capable of deasserting the ON/OFF signal to stop the peripheral bus clock signal upon the occurrence of a predetermined condition. The state machine further prevents the deassertion of the ON/OFF signal for a predetermined time if a clock request signal is asserted by a slave device coupled to the peripheral bus.

The present invention still further contemplates a method for controlling a peripheral bus clock signal comprising the steps of generating a peripheral bus clock signal within a clock generator, providing the peripheral bus clock signal on a peripheral bus, and generating an indicator signal indicative of a decision to stop the peripheral bus clock signal. If a clock request signal is not asserted by a slave device within a predetermined time after generating the indicator signal, the peripheral bus clock signal is stopped. If the clock request signal is asserted by the slave device within the predetermined time after generating the indicator signal, the peripheral bus clock signal is kept on for at least a predetermined amount of time.

BRIEF DESCRIPTION OF THE DRAWINGS

Other objects and advantages of the invention will become apparent upon reading the following detailed description and upon reference to the accompanying drawings in which.

Figure 1:
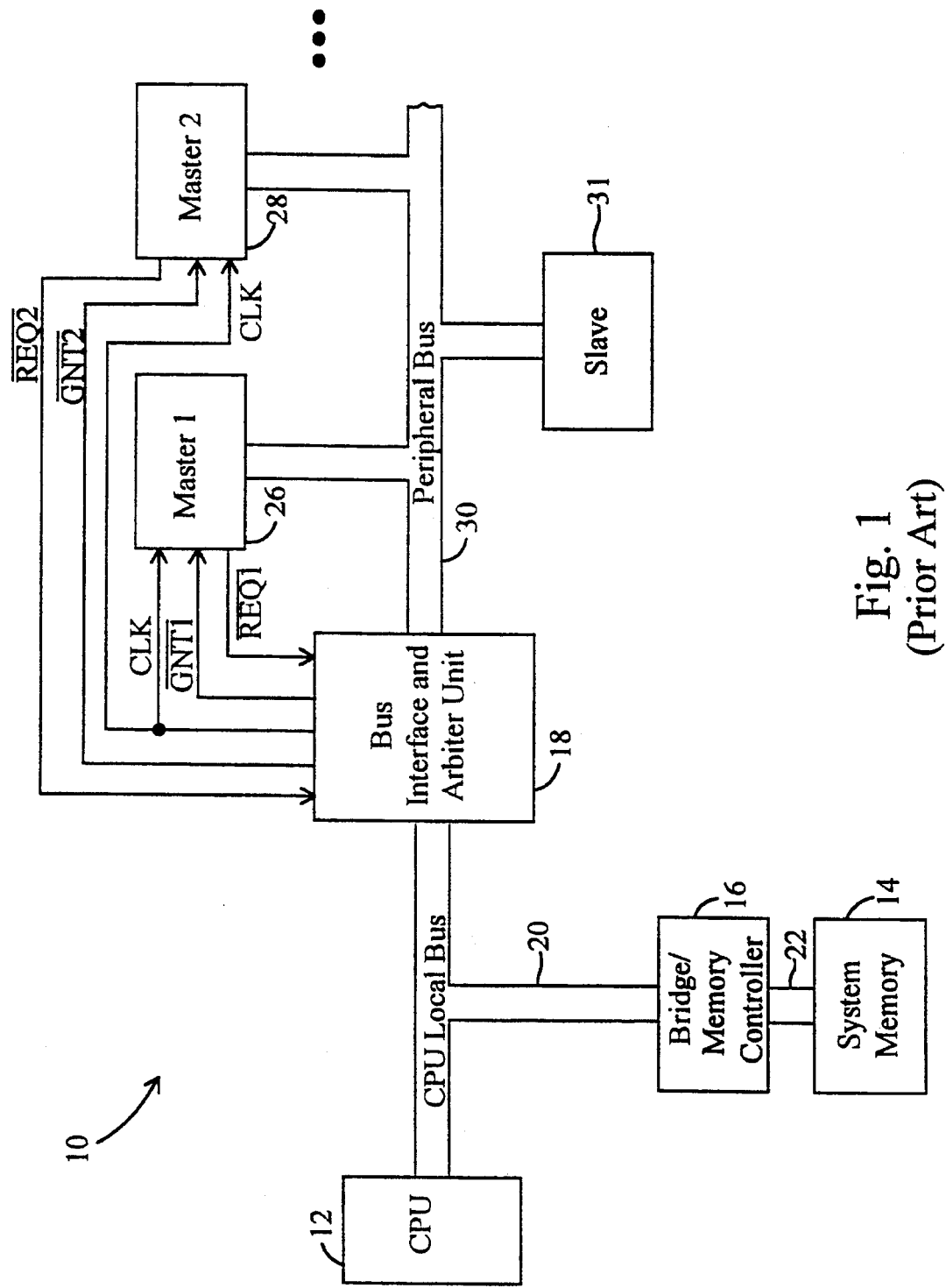
FIG. 1 is a block diagram that illustrates a computer system including a peripheral bus and a plurality of alternate bus masters coupled thereto.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
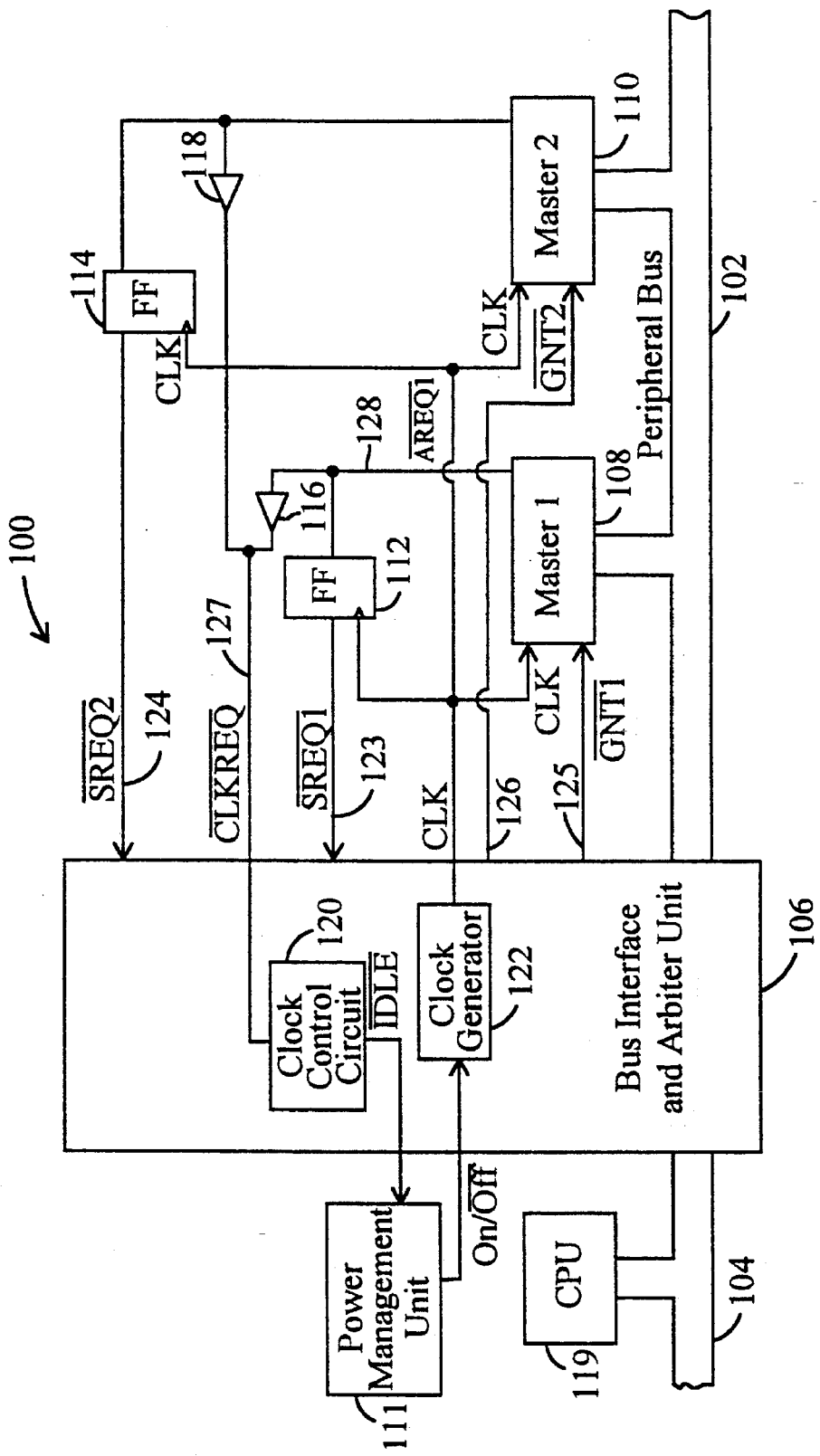
FIG. 2 is a block diagram that illustrates a portion of a computer system including a clock control circuit for re-starting a peripheral bus clock signal.

Referring now to FIG. 2, a block diagram is shown of a portion of a computer system 100 in which a peripheral bus 102 is coupled to a CPU local bus 104 through a bus interface and arbiter unit 106. An alternate bus master 108 labeled "Master1" and a second alternate bus master 110 labeled "Master2" are coupled to peripheral bus 102, and a microprocessor (CPU) 119 is coupled to CPU local bus 104. A power management unit 111, flip-flops 112 and 114, and signal drivers 116 and 118 are further coupled to bus interface and arbiter unit 106.

The alternate bus masters 108 and 110 could be embodied by a variety of specific peripheral bus devices. For example, alternate bus master 108 could be embodied by a local area network (LAN) device that connects other computer systems to peripheral bus 102. Similarly, alternate bus master 110 could be embodied by an expansion bus interface that connects peripheral bus 102 to other peripheral buses.

Peripheral bus 102 has a predetermined bit width and may be connected to a variety of other peripheral devices such as CD-ROM devices. In one embodiment, peripheral bus 102 is implemented using the PCI standard bus configuration, although other peripheral bus standard configurations could be alternatively employed. The PCI standard bus configuration is described in the publication *PCI Local Bus Specification*, Revision 2, Apr. 30, 1993, PCI Special Interest Group. This document is incorporated herein by reference in its entirety.

Microprocessor 119 is a data processing unit that implements a predetermined instruction set. Exemplary processing units include the model 80386 and model 80486 microprocessors. It is noted that the CPU local bus 104 may couple microprocessor 119 to a variety of other components, such as a cache memory and a memory controller.

The bus interface and arbiter unit 106 includes conventional circuitry that controls well known interfacing functions such as orchestrating and transferring control, data, and address signals between microprocessor 119 and devices coupled to peripheral bus 102. The bus interface and arbiter unit 106 further arbitrates and prioritizes devices that contend for the mastership of peripheral bus 102. Similar to the example described previously in conjunction with FIG. 1, arbitration logic within the bus interface and arbiter unit 106 is configured to detect a synchronous request signal asserted by an alternate bus master and to generate an associated grant signal when mastership of the peripheral bus 102 can be attained. The bus interface and arbiter unit 106 receives synchronous request signals $\overline{SREQ1}$ and $\overline{SREQ2}$ at lines 123 and 124, respectively, and generates grant signals $\overline{GNT1}$ and $\overline{GNT2}$ at lines 125 and 126, respectively. It will be appreciated by those skilled in the art that these portions of the bus interface and arbiter unit 106 could be implemented using a variety of specific circuit configurations, and that exemplary circuit configurations are described in a host of publications of the known prior art.

The bus interface and arbiter unit 106 additionally includes a clock control circuit 120 and a clock generator 122. The clock generator 122 generates a peripheral bus clock signal labeled "CLK" for driving peripheral devices such as alternate bus master 108 and alternate bus master 110. As will be explained in greater detail below, the clock control circuit 120 controls the re-starting of clock generator 122 to accommodate alternate bus masters after power management unit 111 has stopped the peripheral bus clock signal CLK.

The operation of computer system 100 will be described next. For this discussion, it is assumed initially that power management unit 111 has caused clock generator 122 to turn off and thus that the peripheral bus clock signal CLK is stopped. Power management unit 111 may be configured to turn off clock generator 122 following, for example, the completion of a peripheral bus cycle executed by microprocessor 119 when no bus request signals are currently pending within bus interface and arbiter unit 106.

If one of the alternate bus masters 108 or 110 requires mastership of peripheral bus 102, a corresponding asynchronous bus request signal is asserted by that device. For example, if alternate bus master 108 requires mastership of peripheral bus 102, asynchronous request signal $\overline{AREQ1}$ is asserted low at line 128. As with the example of FIG. 1, the request signal received by bus interface and arbiter unit 106 at line 123 must be synchronous to the peripheral bus clock signal CLK. However, at this point, the clock generator 122 is turned off. Therefore, to provide a synchronous request signal, the asynchronous request signal $\overline{AREQ1}$ is buffered through signal driver 116 which causes an asynchronous clock request signal $\overline{CLKREQ}$ at line 127 to be asserted low. When clock control circuit 120 detects the low assertion of the clock request signal $\overline{CLKREQ}$, a signal $\overline{IDLE}$ is deasserted high by clock control circuit 120 which causes the power management unit 111 to turn on clock generator 122 and thus re-start the peripheral bus clock signal CLK (i.e., by driving signal ON/$\overline{OFF}$ high).

Upon the rising edge of the first peripheral clock signal CLK, the logical low signal at the line 128 (i.e., signal $\overline{AREQ1}$) is latched into flip-flop 112 and is driven at the output of flip-flop 112. Accordingly, a synchronous request signal $\overline{SREQ1}$ dictated by the output state of flip-flop 112 goes low. It is noted that the low transition of signal $\overline{SREQ1}$ occurs synchronously with the clock signal CLK.

When the bus interface and arbiter unit 106 detects the low assertion of the synchronous request signal $\overline{SREQ1}$, the bus interface and arbiter unit 106 generates the grant signal $\overline{GNT1}$ according to its internal arbitration logic and consequently grants mastership of the peripheral bus 102 to the alternate bus master 108.

In the preferred embodiment, the alternate bus master 108 asserts the asynchronous request signal $\overline{AREQ1}$ for a total of two clock cycles when mastership of peripheral bus 102 is desired. When the clock control circuit 120 detects the resulting low signal at line 127, the clock control circuit 120 takes over the drive and maintains a logical low signal at line 127, even though the asynchronous request signal $\overline{AREQ1}$ has been deasserted by alternate bus master 108 following the two clock cycles. After the $\overline{IDLE}$ signal is deasserted high and clock generator 122 has been turned on by power management unit 111, the peripheral bus clock signal CLK cannot be stopped until the system microprocessor 119 regains mastership of peripheral bus 102, at which point the power management unit 111 may determine that the clock generator 122 can be stopped. For example, as stated previously, power management unit 111 may be configured to stop the peripheral bus clock signal CLK upon the completion of a peripheral bus cycle executed by microprocessor 119 if no bus request signals are currently pending within bus interface and arbiter unit 106. When the power management unit 111 determines that the peripheral bus clock signal CLK can be stopped according to such a predetermined condition, the clock control circuit 120 drives the clock request signal $\overline{CLKREQ}$ high for one clock cycle. Following this, the clock control circuit 120 releases the drive of the clock request signal $\overline{CLKREQ}$ and tri-states line 126. The power management unit 111 then turns off clock generator 122 by driving signal ON/$\overline{OFF}$ low, thereby causing the peripheral bus clock signal CLK to stop.

Figure 2A:
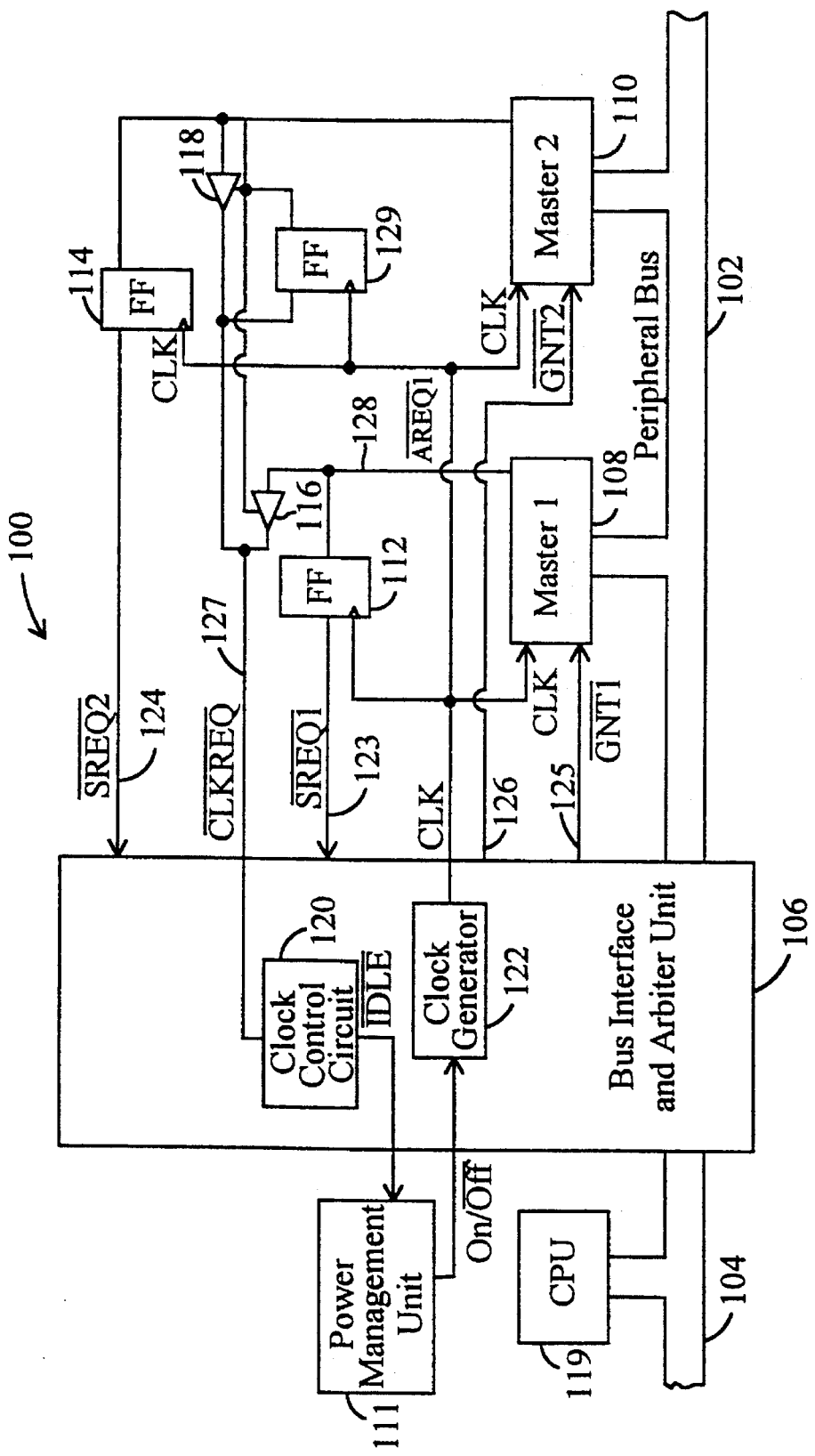
FIG. 2A is a block diagram that illustrates a portion of a computer system including a flip-flop for enabling a pair of signal drivers.

It is noted that in the preferred embodiment, signal drivers 116 and 118 are enabled only if line 127 was sampled high during the rising edge of the last peripheral bus clock signal CLK. This prevents possible signal contention at line 127 if an asynchronous request signal $\overline{AREQx}$ (i.e., $\overline{AREQ1}$ or $\overline{AREQ2}$) is asserted low at the same time the clock control circuit 120 drives line 127 high. An implementation of this feature is illustrated in FIG. 2A in which a flip-flop 129 is used to sample line 127 during each cycle of the peripheral clock signal CLK, and to enable signal drivers 116 and 118 only if line 127 was sampled high.

Referring back to FIG. 2, if the asynchronous request signals $\overline{AREQ1}$ and $\overline{AREQ2}$ are asserted simultaneously or concurrently, indicating that both alternate bus masters 108 and 110 desire mastership of peripheral bus 102, the clock request signal $\overline{CLKREQ}$ will again be driven low, thereby causing the peripheral bus clock signal CLK to restart. The synchronous request signals $\overline{SREQ1}$ and $\overline{SREQ2}$ are accordingly provided at the outputs of flip-flops 112 and 114, respectively, and are received at bus interface and arbiter unit 106. One of the grant signals $\overline{GNT1}$ or $\overline{GNT2}$ will thereafter be asserted in accordance with the predetermined priority established by the internal arbitration logic, and the other grant signal will be delayed until the "higher-priority" alternate bus master has completed its corresponding bus cycle. Thereafter, the bus interface and arbiter 106 unit asserts the other grant signal to allow the "lower priority" alternate bus master to execute its corresponding bus cycle.

Figure 3:
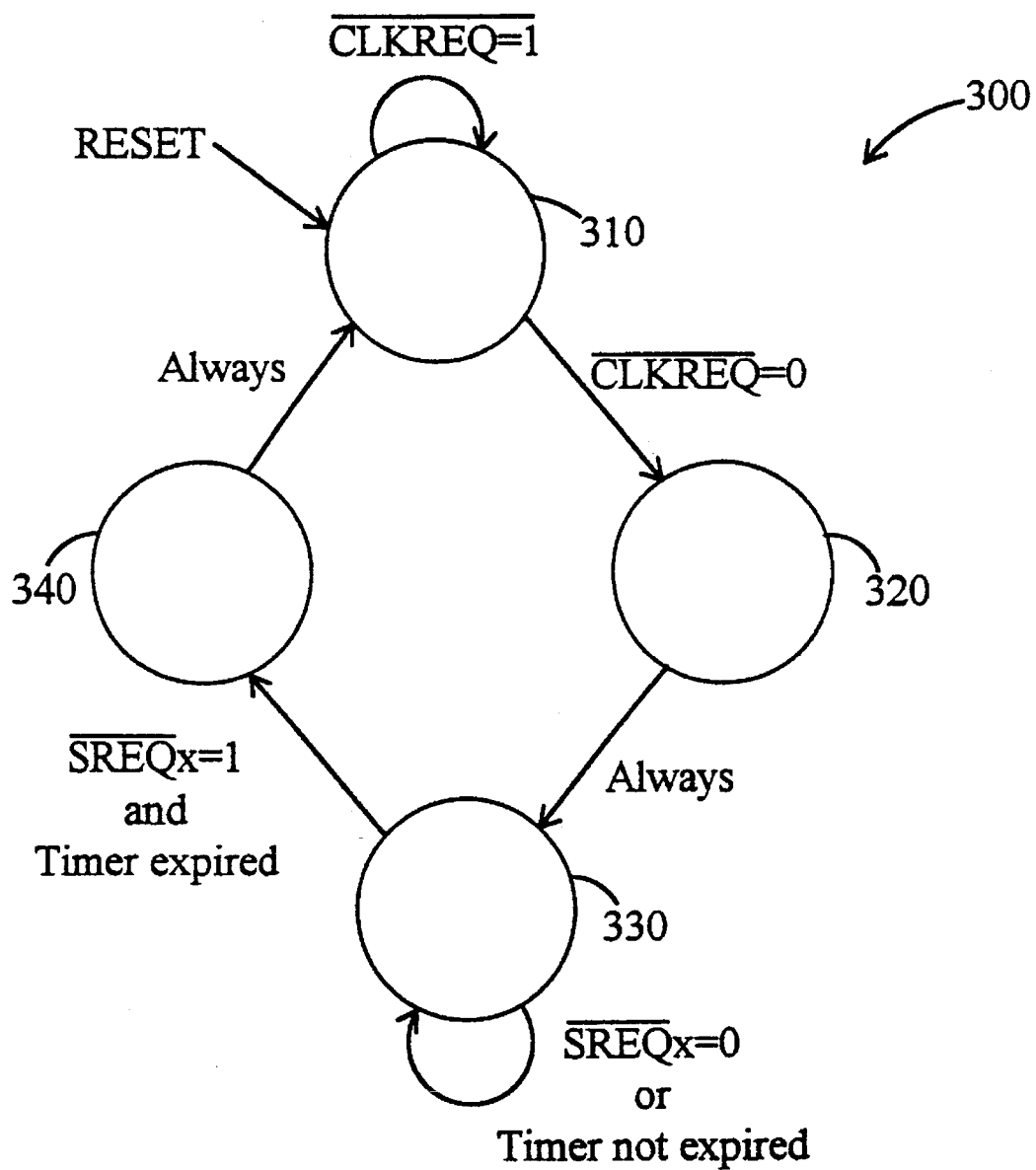
FIG. 3 is a diagram of an algorithmic state machine embodied within the clock control circuit of FIG. 2.

The internal logic of the clock control circuit 120 is next considered. FIG. 3 is a diagram of an algorithmic state machine 300 embodied within the clock control circuit 120. State machine 300 includes four states 310, 320, 330 and 340. When the peripheral bus clock signal CLK is stopped, state machine 300 is in an idle state 310. State machine 300 remains in state 310 for as long as the clock request signal $\overline{CLKREQ}$ is high.

When the clock request signal $\overline{CLKREQ}$ goes low, state machine 300 enters a state 320. This transition occurs when one of the asynchronous request signals $\overline{AREQx}$ has been asserted by one of the alternate bus masters. During state 320, the clock control circuit 120 drives line 127 low and deasserts signal $\overline{IDLE}$ high. Power management unit 111 detects the deassertion of signal $\overline{IDLE}$ and consequently turns on clock generator 122 to re-start the peripheral bus clock signal CLK.

State machine 300 next enters state 330 during which the $\overline{IDLE}$ signal continues to be deasserted high. State machine 300 remains in state 330 for the entire time that a synchronous request signal $\overline{SREQx}$ is low. If all synchronous request signals are high, state machine 300 remains in state 330 for a predetermined time in accordance with a delay time established by an internal timer. This delay time is provided to ensure that ample time is provided after re-starting the clock signal CLK for the corresponding synchronous request signal $\overline{SREQx}$ to be driven low (i.e., by flip-flop 112 or 114). In one embodiment, the internal timer of state 330 is defined to ensure that at least four clock cycles have transpired before state machine 300 can exit from state 330.

When the synchronous request signals $\overline{SREQx}$ are high and the timer has expired, state machine 300 enters state 340. During state 340, the clock request signal $\overline{CLKREQ}$ is driven high by the clock control circuit 120 for one clock cycle. The $\overline{IDLE}$ signal is further asserted low.

The state machine 300 next reverts back to idle state 310 and clock control circuit 120 tri-states the clock request line 127. The power management unit 111 may subsequently turn off clock generator 122 after the system microprocessor 119 has regained mastership of peripheral bus 102, or according to any other desired power management scheme. Thereafter, the peripheral bus clock signal CLK may again be re-started by another alternate bus master in the manner described above by asserting the clock request signal low.

Referring back to FIG. 2, it is noted that flip-flops 112 and 114 as well as signal drivers 116 and 118 may be incorporated as integral parts of the alternate bus masters 108 and 110. It is further noted that although signal lines 123–127 are shown separately from peripheral bus 102 for simplicity, signal lines 123–127 may be predefined control lines of the peripheral bus 102.

Figure 4:
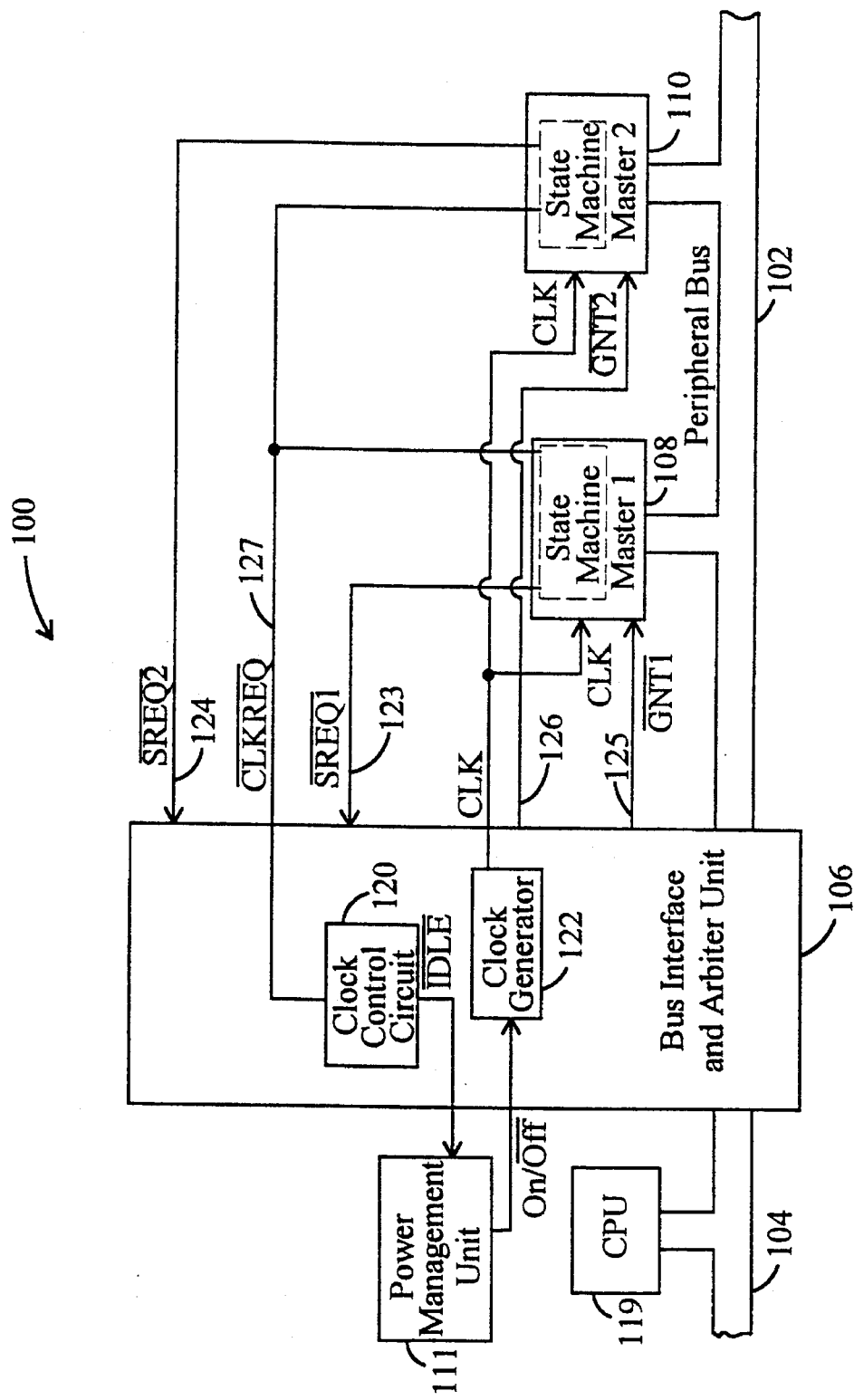
FIG. 4 is a block diagram of a portion of a computer system including alternate bus masters having internal state machines for requesting the peripheral bus clock signal and generating synchronous bus request signals.
Figure 5:
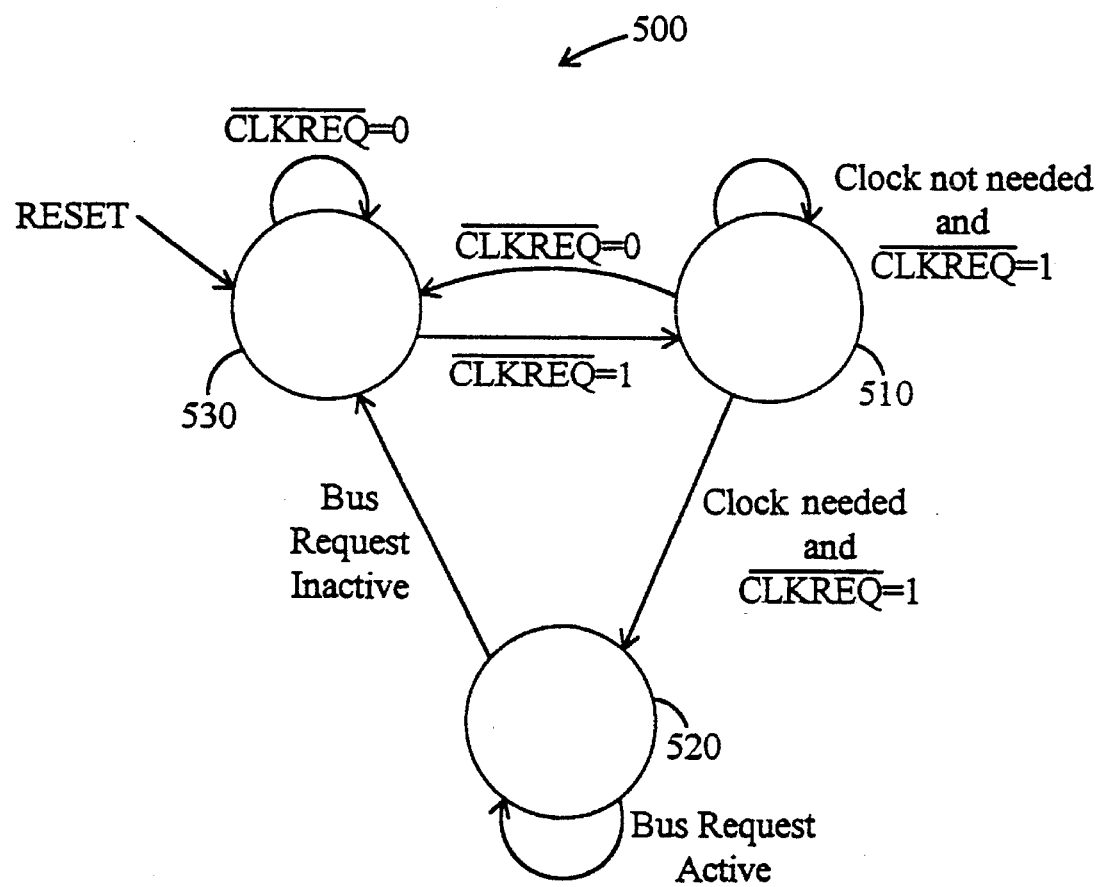
FIG. 5 is a diagram of an algorithmic state machine embodied within an alternate bus master.

In another embodiment as illustrated in FIG. 4, a state machine is incorporated within each alternate bus master to generate the clock request signal $\overline{\text{CLKREQ}}$ and the synchronous request signal $\overline{\text{SREQx}}$. Circuit portions that correspond to those of FIG. 2 are numbered identically. FIG. 5 is a diagram of an algorithmic state machine 500 incorporated within each alternate bus master of such an embodiment. State machine 500 includes states 510, 520 and 530.

Referring to FIG. 5 with reference to FIGS. 3 and 4, following reset, when the clock request signal goes high, state machine 500 transitions to state 510. At this point the power management unit 111 may signal the clock generator 122 to stop the clock. If the master peripheral has no need for the clock, state machine 500 remains in state 510. If system events cause the clock request signal to go low, state machine 500 reverts to state 530. If while in state 510, the master needs the clock, the state machine 500 transitions to state 520, causing the clock request signal $\overline{\text{CLKREQ}}$ to be driven low. The clock control circuit 120 then signals the clock generator 122 to restart the clock if it was stopped. The master may now assert its synchronous bus request signal $\overline{\text{SREQ}}$ to acquire the bus and perform its transaction. As long as the master maintains its bus request, the state machine remains in state 520. When the master deasserts its bus request, the state machine transitions to state 530 causing the clock request signal $\overline{\text{CLKREQ}}$ to tri-state.

As a result of the systems of FIGS. 2 and 4, a peripheral bus clock signal may be stopped for power management while still accommodating alternate bus masters that must assert a synchronous bus signal to obtain mastership of the peripheral bus. Power consumption of the computer systems may thereby be reduced while maintaining broad compatibility.

Figure 6:
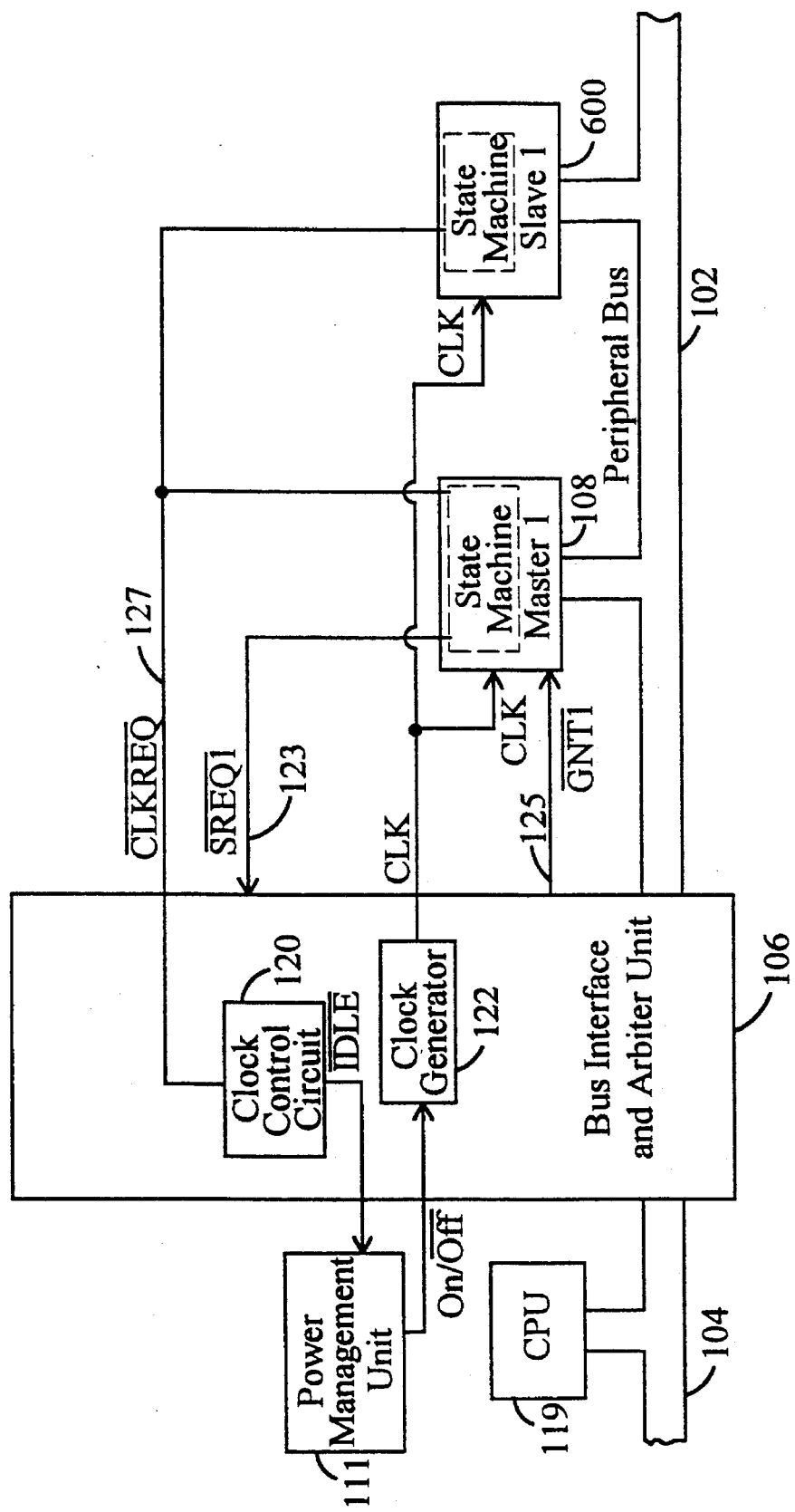
FIG. 6 is a block diagram that illustrates a computer system including a slave device capable of asserting a clock request signal.

Turning next to FIG. 6, a portion of a similar computer system is shown in which a slave device 600 is coupled to peripheral bus 102. Circuit blocks that correspond to those of FIG. 4 are numbered identically.

Slave device 600 is coupled to receive the peripheral clock signal CLK and is coupled to line 127. As will be explained in greater detail below, the embodiment of FIG. 6 allows slave device 600 to prevent the peripheral bus clock signal from being stopped if the peripheral bus clock signal is required by the slave following a peripheral bus cycle. For example, slave device 600 may require the peripheral bus clock signal after the completion of a peripheral bus transfer cycle to empty an internal FIFO buffer.

During operation of the embodiment of FIG. 6, slave device 600 monitors the clock request signal $\overline{\text{CLKREQ}}$ at line 127. If slave device 600 detects a high assertion of the clock request signal $\overline{\text{CLKREQ}}$ and if the peripheral bus clock signal CLK is still required by the slave device, slave device 600 drives line 127 back low on the next clock cycle to prevent the peripheral bus clock signal CLK from being stopped.

Figure 7:
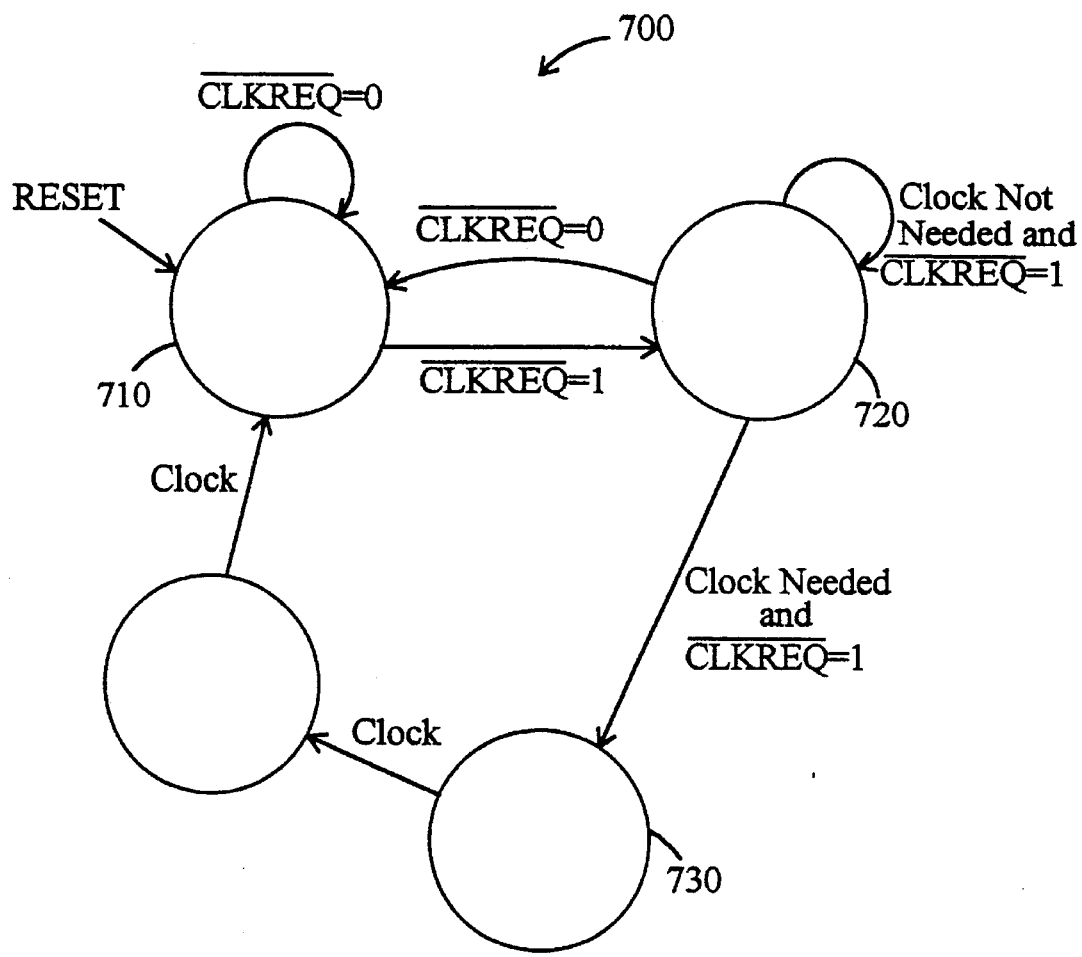
FIG. 7 is a diagram of an algorithmic state machine embodied within the slave device.

FIG. 7 is a diagram of an algorithmic state machine 700 embodied within slave device 600. Upon reset of the system, state machine 700 enters state 710 during which line 127 is tri-stated by slave 600. State machine 700 remains in state 710 for as long as the clock request signal $\overline{\text{CLKREQ}}$ at line 127 is low.

When the clock request signal $\overline{\text{CLKREQ}}$ at line 127 goes high, state machine 700 enters state 720. During state 720, line 127 continues to be tri-stated by slave device 600. State machine 700 remains in state 720 for as long as the clock request signal $\overline{\text{CLKREQ}}$ remains high and while there is no need for the peripheral bus clock signal CLK.

If the clock request signal $\overline{\text{CLKREQ}}$ at line 127 falls back low, state machine 700 returns to state 710. If, on the other hand, the peripheral bus clock signal CLK is needed by slave 600 and the clock request signal at line 127 is high, state machine 700 enters state 730. During state 730, the clock request signal at line 127 is pulled low by slave device 600 for two clock cycles. State machine 700 then re-enters state 710 and line 127 is tri-stated by slave device 600.

Figure 8:
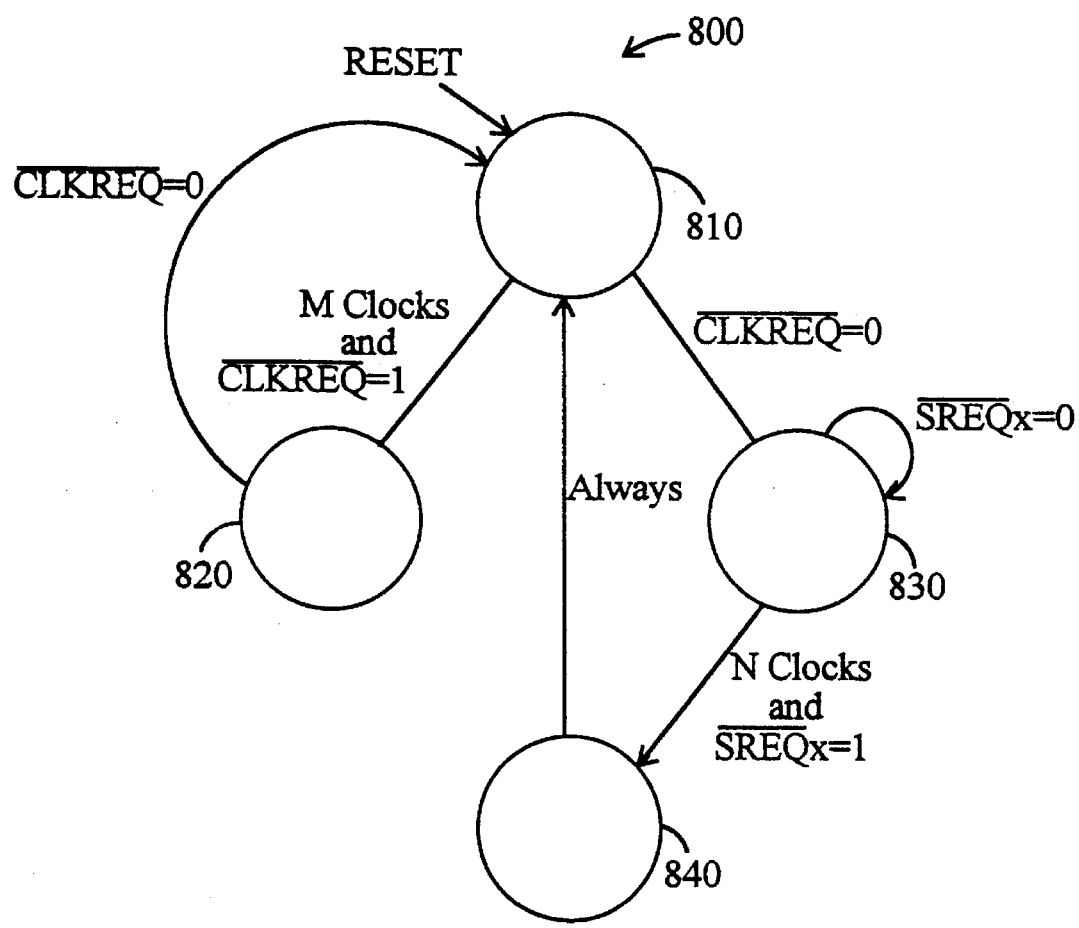
FIG. 8 is a diagram of an algorithmic state machine embodied within the clock control circuit.

FIG. 8 is a diagram of an alternative embodiment of a state machine 800 embodied within the clock control circuit 120 of FIGS. 2, 4 and 6. State machine 800 is responsive to clock request signals (i.e., $\overline{\text{CLKREQ}}$) asserted by both master and slave devices. In this embodiment, both the re-starting and the stopping of the peripheral bus clock signal are directly controlled by clock control circuit 120. It is noted that power management unit 111 may be configured to control clock generator 122 at other times during the operation of the computer system.

Upon reset, state machine 800 enters state 810 during which the clock request signal $\overline{\text{CLKREQ}}$ at line 127 is tri-stated and is passively pulled high by the clock control circuit 120 and during which the peripheral bus clock signal CLK is on. If the clock request signal at line 127 is detected high for a predetermined number of clocks (i.e., M clock cycles), state machine 800 enters state 820.

During state 820, line 127 continues to be tri-stated and pulled high by the clock control circuit 120 and the peripheral bus clock signal CLK is stopped. It is noted that clock generator 122 is directly controlled through power management unit 111 by clock control circuit 120 to stop the peripheral bus clock signal CLK. The state machine 800 remains in state 820 until the clock request signal $\overline{\text{CLKREQ}}$ at line 127 is pulled low, for example, by alternate bus master 108. When the clock request signal $\overline{\text{CLKREQ}}$ is asserted low, state machine 800 reverts back to state 810 and the peripheral bus clock signal CLK is re-started.

On the next clock cycle, state machine 800 will enter state 830 if the clock request signal $\overline{\text{CLKREQ}}$ continues to be asserted low. During state 830, the clock control circuit 120 maintains the low drive at line 127 so the master or slave device can release the drive. If a synchronous bus request signal (i.e., $\overline{\text{SREQx}}$) is asserted, state machine 800 remains in state 830 until the bus request signal is deasserted high. If no bus request signal $\overline{\text{SREQx}}$ is asserted low and a predetermined number of clock cycles (i.e., N clocks) have transpired, state machine 800 enters state 840. During state 840, the clock request signal $\overline{\text{CLKREQ}}$ at line 127 is asserted high for one clock cycle by clock control circuit 120. State machine 800 then reverts back to state 810.

State machine 800 will remain in state 810 until the clock request signal at line 127 is again pulled low, thereby causing state machine 800 to enter state 830, or until M clock cycles have transpired, at which state machine 800 will enter state 820 and the peripheral bus clock signal will be stopped.

From the foregoing, it is evident that if slave device 600 requires that the peripheral clock signal CLK remain on, it will detect the low assertion of the clock request signal (referred to generally as an "indicator" signal) at line 127 by the clock control circuit 120 (i.e., during state 340, FIG. 3 or state 840, FIG. 8) and will drive the clock request signal low to keep the clock running for an additional timed period as determined by state 330 for the state machine 300 (of FIG. 3) or by state 830 for the state machine 800 (of FIG. 8).

The algorithmic state machines 300, 500, 700 and 800 may be reduced to sequential logic circuits by employing a variety of well known circuit reduction techniques. For example, sequential logic circuitry that implements state machines 300 and 500 may be attained in accordance with the state reduction techniques taught within the publication *Digital Design* by M. Morris Mano, Prentice-Hall, Inc., pp 220–236; and within the publication *Digital Computer Fundamentals*—6th Edition by Thomas Bartee, McGraw-Hill Book Company, pp 170–175. These publications are incorporated herein by reference.

Computer-aided design tools may alteratively be employed to reduce the state machines 300, 500, 700 and 800 to sequential logic circuits. Exemplary computer-aided design tools include the VHSIC hardware description language and the VERILOG description language.

The power management unit 111 of FIGS. 2 and 4 may be configured to implement a variety of additional power management functions in addition to that described above. For example, power management unit 111 may be designed to implement functions similar to those described in U.S. Pat. No. 5,167,024 issued Nov. 24, 1992 to Smith et al. This patent is incorporated herein by reference in its entirety.

It is noted that slave device 600 could be embodied by a variety of specific peripheral devices. For example, slave device 600 could be a disk controller device or an audio controller device.

Furthermore, although the clock generator of 122 is shown within a bus interface and arbiter unit 106 in the embodiments described above, the clock generator 122 could be incorporated within a variety of alternative circuit blocks of computer system 100.

This application is related to the commonly assigned, co-pending application Ser. No. 08/125,406 entitled "System and Method for Re-Starting a Peripheral Bus Clock Signal and Requesting Mastership of a Peripheral Bus" filed Sep. 22, 1993 by Gephardt et al. This co-pending application is incorporated herein by reference in its entirety.

Numerous variations and modifications will become apparent to those skilled in the art once the above disclosure is fully appreciated. It is intended that the following claims be interpreted to embrace all such variations and modifications.

What is claimed is:

1. A computer system comprising:

a microprocessor;

a local bus coupled to said microprocessor;

a peripheral bus;

a bus interface unit coupled to said local bus and to said peripheral bus configured to control the transfer of data and address signals between said local bus and said peripheral bus;

a clock generator circuit configured to provide a peripheral bus clock signal on said peripheral bus and further configured to selectively stop and re-start said peripheral bus clock signal;

a clock control circuit coupled to said clock generator circuit wherein said clock control circuit is configured to generate a clock-off control signal to stop said peripheral bus clock signal upon an occurrence of a predetermined condition, and wherein said clock control circuit is configured to deassert a clock request signal at a clock request line prior to generating said clock-off control signal and stopping said peripheral bus clock signal; and a slave device coupled to said peripheral bus, wherein said slave device is configured to monitor said clock request line and wherein, if said clock request signal is deasserted, said clock control circuit is configured to assert said clock request signal if said peripheral bus clock signal is required by said slave device, wherein said clock control circuit is configured to delay the generation of said clock-off control signal for a predetermined time if said clock request signal is asserted by said slave device.

2. The computer system as recited in claim 1 wherein said slave device includes a state machine coupled to said clock request line, wherein said state machine is configured to detect the deassertion of said clock request signal and is configured to reassert said clock request signal if said peripheral bus clock signal is required by said slave device.

3. The computer system as recited in claim 1 further comprising an alternate bus master coupled to said peripheral bus wherein said alternate bus master is configured to assert said clock request signal when said peripheral bus clock signal is stopped, and wherein said clock control circuit is configured to generate a clock-on control signal that causes said peripheral bus clock signal to re-start in response to the assertion of the clock request signal.

4. The computer system as recited in claim 3 further comprising a bus arbiter unit coupled to said peripheral bus and configured to arbitrate mastership of said peripheral bus.

5. The computer system as recited in claim 3 further comprising a power management unit coupled to said clock control circuit and to said clock generator circuit, wherein said power management unit is configured to provide a control signal to said clock generator for selectively stopping and re-starting said peripheral bus clock signal, and wherein said clock control circuit is configured to provide said clock-on control signal to said power management unit in response to said clock request signal.

6. The computer system as recited in claim 5 wherein said power management unit is configured to stop said peripheral bus clock signal upon the occurrence of a predetermined condition after said microprocessor has attained mastership of said peripheral bus.

7. The computer system as recited in claim 1 wherein said peripheral bus is a PCI bus.

8. The computer system as recited in claim 1 wherein said clock request line is incorporated on said peripheral bus.

9. A computer system comprising:

a microprocessor;

a local bus coupled to said microprocessor;

a peripheral bus;

a bus interface unit coupled to said local bus and to said peripheral bus configured to control the transfer of data and address signals between said local bus and said peripheral bus;

a clock generator circuit configured to provide a peripheral bus clock signal on said peripheral bus and further configured to selectively stop and re-start said peripheral bus clock signal;

a clock control circuit coupled to said clock generator circuit wherein said clock control circuit is configured to generate a clock-off control signal to stop said peripheral bus clock signal upon an occurrence of a predetermined condition, and wherein said clock control circuit is configured to deassert a clock request signal at a clock request line prior to generating said clock-off control signal and stopping said peripheral bus clock signal; and a slave device coupled to said peripheral bus, wherein said slave device is configured to monitor said clock request line and wherein, if said clock request signal is deasserted, said clock control circuit is configured to assert said clock request signal if said peripheral bus clock signal is required by said slave device; and wherein said slave device includes a state machine coupled to said clock request line, wherein said state machine is configured to detect the deassertion of said clock request signal and is configured to reassert said clock request signal if said peripheral bus clock signal is required by said slave device; and wherein said clock control circuit includes a second state machine, wherein said second state machine is configured to deassert said clock request signal at said clock request line prior to generating said clock-off control signal, and wherein said second state machine is configured to delay the generation of said clock-off control signal for a predetermined time if said clock request signal is reasserted by said slave device and is configured to not delay the generation of said clock-off signal for said predetermined time if said clock request signal is not reasserted by said slave device.

10. A computer system comprising:

a microprocessor;

a local bus coupled to said microprocessor;

a peripheral bus;

a bus interface unit coupled to said local bus and to said peripheral bus configured to control the transfer of data and address signals between said local bus and said peripheral bus;

a bus arbiter unit coupled to said peripheral bus and configured to arbitrate mastership of said peripheral bus;

a clock generator circuit configured to provide a peripheral bus clock signal on said peripheral bus and further configured to selectively stop and re-start said peripheral bus clock signal;

a clock control circuit coupled to said clock generator circuit wherein said clock control circuit is configured to generate a clock-off control signal to stop said peripheral bus clock signal upon an occurrence of a predetermined condition, and wherein said clock control circuit is configured to deassert a clock request signal at a clock request line prior to generating said clock-off control signal and stopping said peripheral bus clock signal;

a slave device coupled to said peripheral bus, wherein said slave device is configured to monitor said clock request line and wherein, if said clock request signal is deasserted, said clock control circuit is configured to assert said clock request signal if said peripheral bus clock signal is required by said slave device; and an alternate bus master coupled to said peripheral bus wherein said alternate bus master is configured to assert said clock request signal when said peripheral bus clock signal is stopped, and wherein said clock control circuit is configured to generate a clock-on control signal that causes said peripheral bus clock signal to re-start in response to the assertion of the clock request signal;

wherein said alternate bus master includes a third state machine that is configured to assert said clock request signal when said peripheral bus clock signal is stopped and is configured to assert a synchronous bus request signal after said peripheral bus clock signal is re-started, wherein said synchronous bus request signal is provided to said bus arbiter unit for requesting mastership of said peripheral bus.

11. The computer system as recited in claim 10 wherein said bus arbiter unit is configured to assert a bus grant signal in response to said synchronous bus request signal.

12. A system for controlling a peripheral bus clock signal comprising:

a clock generator configured to generate said peripheral bus clock signal, wherein said peripheral bus clock signal is configured to be stopped and re-started in response to an ON/OFF signal;

a peripheral bus including a clock line configured to transfer said peripheral bus clock signal; and a clock control circuit coupled to said clock generator, wherein said clock control circuit includes a state machine configured to deassert said ON/OFF signal to stop said peripheral bus clock signal upon the occurrence of a predetermined condition, and wherein said state machine is configured to prevent the deassertion of said ON/OFF signal for a predetermined time if a clock request signal is asserted by a slave device coupled to said peripheral bus.

13. The system for controlling a peripheral bus clock signal as recited in claim 12 wherein said state machine of said clock control circuit is configured to deassert said clock request signal prior to deasserting said ON/OFF signal.

14. The system for controlling a peripheral bus clock signal as recited in claim 13 wherein said state machine of said clock control circuit is configured to deassert said ON/OFF signal to stop said peripheral bus clock signal if said clock request signal is not reasserted by said slave device within a second predetermined time after said clock request signal is deasserted by said state machine.

15. The system for controlling a peripheral bus clock signal as recited in claim 12 wherein said peripheral bus is a PCI standard bus.

16. The system for controlling a peripheral bus clock signal as recited in claim 12 further comprising a control line incorporated on said peripheral bus configured to couple said clock request signal between said clock control circuit and said slave device.

17. A method for controlling a peripheral bus clock signal comprising the steps of:

generating a peripheral bus clock signal within a clock generator;

providing said peripheral bus clock signal on a peripheral bus;

generating an indicator signal to a slave device indicative of a decision to stop said peripheral bus clock signal; and if a clock request signal is not asserted by said slave device within a predetermined time after generating said indicator signal, stopping said peripheral bus clock; or if a clock request signal is asserted by said slave device within said predetermined time after generating said indicator signal, keeping on said peripheral bus clock signal for at least a predetermined amount of time.

18. The method for controlling a peripheral bus clock signal as recited in claim 17 further comprising the step of providing said indicator signal on a control line of said peripheral bus.

* * * * *